(12) United States Patent
Petrus

(10) Patent No.: US 8,116,219 B1
(45) Date of Patent: Feb. 14, 2012

(54) COMMUNICATION SYSTEM WITH MULTI-DIMENSIONAL RATE ADAPTATION

(75) Inventor: Paul Petrus, San Jose, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 685 days.

(21) Appl. No.: 12/235,287

(22) Filed: Sep. 22, 2008

(51) Int. Cl.
*H04L 12/00* (2006.01)

(52) U.S. Cl. ........................ 370/252; 370/329

(58) Field of Classification Search .................. 370/252, 370/253, 329, 332, 333; 455/450–453, 465, 455/509–514
See application file for complete search history.

(56) References Cited

U.S. PATENT DOCUMENTS

| | | | |
|---|---|---|---|
| 7,009,949 B1 | 3/2006 | Gopalakrishnan et al. | |
| 7,280,514 B1 | 10/2007 | Chang et al. | |
| 7,423,970 B2 | 9/2008 | Wang et al. | |
| 7,751,493 B2 | 7/2010 | Niu et al. | |
| 7,756,059 B1 | 7/2010 | Bharghavan | |
| 7,782,825 B2 | 8/2010 | Yang et al. | |
| 7,792,500 B2 * | 9/2010 | Luo et al. | 455/101 |
| 7,808,952 B2 | 10/2010 | Duan et al. | |
| 2003/0236080 A1 * | 12/2003 | Kadous et al. | 455/226.1 |
| 2008/0310558 A1 * | 12/2008 | Gaikwad et al. | 375/340 |
| 2010/0067401 A1 * | 3/2010 | Medvedev et al. | 370/253 |

OTHER PUBLICATIONS

U.S. Appl. No. 12/827,803, entitled "Measuring Received Signal Strength on Neighboring Frequencies of a Channel with Interference in a Wireless Device", by Paul J. Husted, Praveen Dua, and Doug Kogan, filed Jun. 30, 2010. 27 pages.
U.S. Appl. No. 12/879,186, entitled "Configuring Antenna Arrays of Mobile Wireless Devices Using Motion Sensors", by Paul J. Husted and Jeffrey L. Smith, filed Sep. 10, 2010. 29 pages.

\* cited by examiner

*Primary Examiner* — Gary Mui
(74) *Attorney, Agent, or Firm* — Meyertons Hood Kivlin Kowert & Goetzel, P.C.

(57) ABSTRACT

Performing wireless transmission of data over a wireless communication medium. A first data structure may be maintained which includes data rate information for transmission using a first number of streams. A second data structure may be maintained which includes data rate information for transmission using a second number of streams. Channel characteristics of the wireless communication medium may be determined. Channel characteristic information may be maintained based on the determined channel characteristics. Accordingly, a stream configuration and data rate may be determined based on the current channel characteristic information. Wireless transmission may be performed using the determined stream configuration and data rate. Determining channel characteristics, maintaining current channel characteristic information, determining a stream configuration and data rate, and performing wireless transmission may be dynamically performed a plurality of times during wireless data transmission.

22 Claims, 8 Drawing Sheets

| PHY Throughput | Data Rate / Stream Configuration | RSSI threshold | PER |
|---|---|---|---|
| 1Mbps | 1 Mbps, CCK | 4 dB | 5% |
| 2Mbps | 2Mbps, CCK | 6 dB | 6% |
| 5.5Mbps | 5.5Mbps, CCK | 7 dB | 10% |
| 11Mbps | 11Mbps, CCK | 10 dB | 20% |
| 13Mbps | MCS0, SS, full-GI, HT40 | | |
| …. | …. | …. | …. |
| | | | |
| 300Mbps | MCS15, DS, half-GI, HT40 | 24 dB | 55% |

FIG. 4 rcFind

COMMUNICATION SYSTEM WITH MULTI-DIMENSIONAL RATE ADAPTATION

FIELD OF THE INVENTION

The present invention relates generally to wireless communication, and more particularly to a rate adaptation scheme for a multiple in multiple out (MIMO) transmission system that can accommodate different transmission rates for a first number of spatial streams and a second number of spatial streams.

DESCRIPTION OF THE RELATED ART

Wireless communication is being used for a plethora of applications, such as in laptops, cell phones, and other wireless communication devices or mobile devices (collectively referred to as "wireless devices"). Some wireless devices in the prior art are capable of performing rate adaptation, i.e., transmitting signals at different transmission rates, e.g., depending on the characteristics of the channel. For example, if the communication channel is noisy, the wireless device may transmit signals at a lower communication rate and possibly with additional error correction. If the communication channel is relatively clear, the wireless device may transmit signals at a higher communication rate and possibly with less error correction.

Some wireless devices that employ MIMO are also capable of selectively transmitting using different spatial stream configurations, e.g., transmitting using one or more streams of data. In other words, some wireless devices are capable of transmitting either a single spatial stream of data or multiple spatial streams of data. However, prior art wireless devices have only been able to perform rate adaptation for one respective stream configuration. For example, prior art wireless devices have only been able to perform rate adaptation for single stream rates, or have only been able to perform rate adaptation for dual stream rates, but not both, e.g., in overlapping configurations.

Therefore, improvements in rate adaptation are desired for wireless devices that are capable of transmitting at different rates using different stream configurations.

SUMMARY OF THE INVENTION

Various embodiments are presented of a system and method for performing wireless communication using rate adaptation for different data rate/stream configurations.

The wireless device maintains one or more data structures comprising data rate information for different stream configurations. For example, the wireless device may maintain a first data structure comprising data rate information for a first number of streams (e.g., single stream transmission) and a second data structure comprising data rate information for a second number of streams (e.g., multiple stream (e.g., dual stream) transmission).

The wireless device may be configured to determine channel characteristics of the wireless communication medium. For example, the wireless device may determine the strength of the wireless communication medium, e.g., whether the medium is noisy or clear.

Based on the determined channel characteristics, the wireless device may be configured to maintain current channel characteristic information. For example, the wireless device may be configured to maintain information regarding various parameters of the wireless communication medium, such as packet error rate (PER), received signal strength indications (RSSI), failed acknowledgements, etc.

The wireless device may then be configured to determine a stream configuration and data rate based on the current channel characteristic information, e.g., using the first and/or second data structure described above, among other possibilities. Thus, the wireless device may be configured to determine a stream configuration, e.g., single stream transmission, dual stream transmission, etc., and also determine a transmission rate for the selected stream configuration, e.g., that provides improved communications based on the current characteristics of the channel.

Once the wireless device determines the appropriate stream configuration and data rate, the device may read into or use the respective data structure to determine the appropriate data rate/stream configuration parameters to achieve the desired data rate and stream configuration. The wireless device may then perform wireless transmission using the determined stream configuration and data rate.

The wireless device is configured to dynamically perform the above method during data transmission, and thus the wireless device may adjust its stream configuration and data rate dynamically based on current channel characteristics. In other words, the wireless device may select the appropriate data rate/stream configuration based on current channel characteristics. Thus, the wireless device may iteratively determine channel characteristics, maintain current channel characteristic information, determine a stream configuration and data rate, and perform wireless transmission a plurality of times during wireless data transmission. The wireless device may dynamically utilize different stream configurations and/or transmission rates as appropriate, dependent on current channel characteristics.

BRIEF DESCRIPTION OF THE DRAWINGS

A better understanding of the present invention can be obtained when the following detailed description of the preferred embodiment is considered in conjunction with the following drawings, in which:

FIG. 4 illustrates an exemplary data structure containing rate information for single stream transmission, according to one embodiment.

Figure 1:
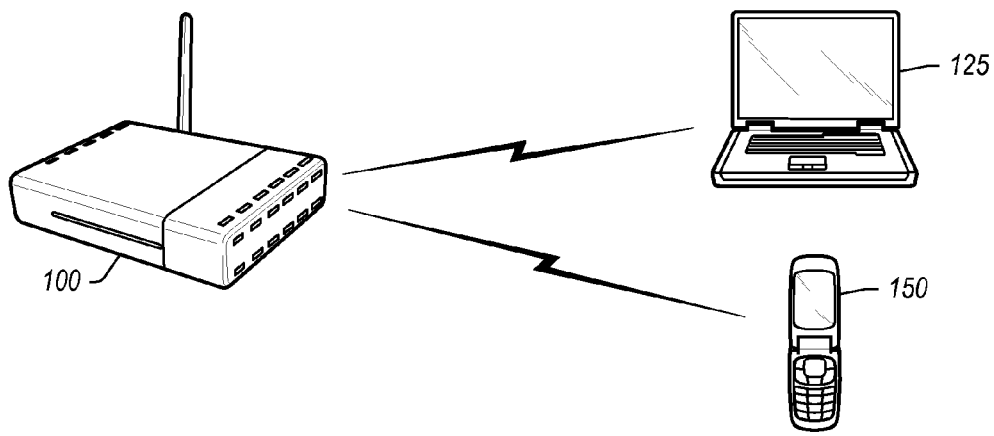
FIG. 1 illustrates exemplary wireless devices performing wireless communication, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

FIG. 1—Exemplary Wireless System

FIG. 1 illustrates an exemplary wireless device 100 wirelessly coupled to wireless devices 125 and 150, according to one embodiment. As shown in FIG. 1, the wireless device 100 may be a router and the wireless devices 125 and 150 may be a laptop or cell phone (or smart phone or other mobile device). However, it should be noted that other wireless devices are envisioned (for the wireless devices 100, 125, and 150), such as personal digital assistants, multimedia players (portable or stationary), routers, and/or other mobile devices/computing systems which are operable to use wireless communication.

During wireless communication, the wireless device 100, 125, and/or 150 may perform various procedures to determine an efficient wireless communication mode. For example, one or more of the wireless devices may determine an efficient wireless communication method, which may include a single stream or dual stream configuration (among other multiple stream configurations), a particular data rate, and/or a particular modulation and encoding, among other possibilities. In some embodiments, this determination may be largely or solely carried out by the wireless device 100. The determination of this wireless communication mode is described in further detail below.

Note that the wireless devices may communicate using various protocols, such as, for example, wireless local area network (WLAN), Bluetooth, and/or other communication protocols, as desired.

Figure 2:
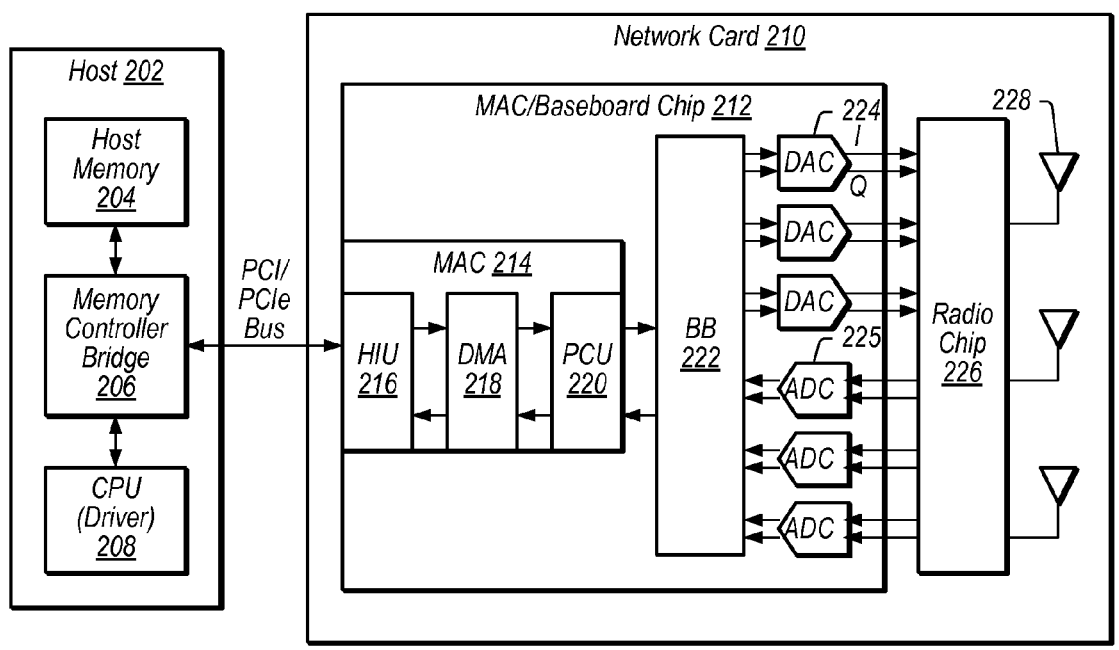
FIG. 2 is an exemplary block diagram of a wireless device of FIG. 1, according to one embodiment.

FIG. 2—Exemplary Block Diagram of the Wireless Device

As shown in FIG. 2, the wireless devices 100, 125, and/or 150 may include various circuitry. However, for convenience, only the wireless device 100 is described below, although these descriptions may apply to wireless devices 125 and 150.

In one embodiment, the wireless device 100 may include host circuitry 202 (including host memory 204, memory controller bridge 206, CPU 208, and/or other circuitry). The host circuitry 202 may be used for performing various functions of the device, e.g., cellular functions for a cell phone.

As also shown, the wireless device 100 may include a network card or circuitry 210. The network card 210 may be coupled to the host circuitry 202 via various busses, such as PCI, PCIe, ISA, etc. The network card 210 may include MAC 214, which may include HIU (High speed Interface Unit) 216, DMA (direct memory access) 218, and/or PCU (Protocol Control Unit) 220. The MAC 214 may be coupled to baseband (BB) 222, which may be in turn coupled to a plurality of digital to analog converters (DACs) 224. These DACs may provide analog output to radio chip 226 which may provide analog signals to other wireless devices (e.g., 125 and/or 150) via antennae 228. Similarly, the ADCs 225 may receive analog signals from radio chip 226 (via antennae 228) and convert them to digital signals for provision to BB 220.

Note that while the above descriptions (and the illustration of FIG. 2) show host circuitry coupled to a network card, other embodiments are envisioned. For example, the host circuitry and network circuitry may be collocated and may not be separated and coupled over a bus as shown in the Figure. More specifically, in one embodiment, the wireless device 100 may include integrated network circuitry.

Additionally, as indicated above, the wireless device 100 may include one or more memory mediums and processors (e.g., including the CPU 208 and host memory 204) for implementing various functionality. For example, in one embodiment, the wireless device 100 may include program instructions stored on the memory medium which may be executable by the processor to perform the functionality or methods described herein. In one embodiment, software of the wireless device 100 (e.g., program instruction stored on a memory medium, that may be executed by a processor) may perform determinations or modifications of current transmission configurations (e.g., as described in the flowcharts below) and hardware of the wireless device 100 may perform actual transmissions of the packets according to the determinations by software. Additionally, in some embodiments, the hardware may further include the ability to automatically attempt lower data rate/stream configuration when packets of higher data rate/stream configurations fail. Information regarding transmitted packets or attempted transmitted packets may then be provided back to the software for future determinations and adaptations, as described below.

It should be noted that the above described system diagram is exemplary only and that various modifications, additional components, removed components, alternate configurations, etc. are envisioned.

Figure 3:
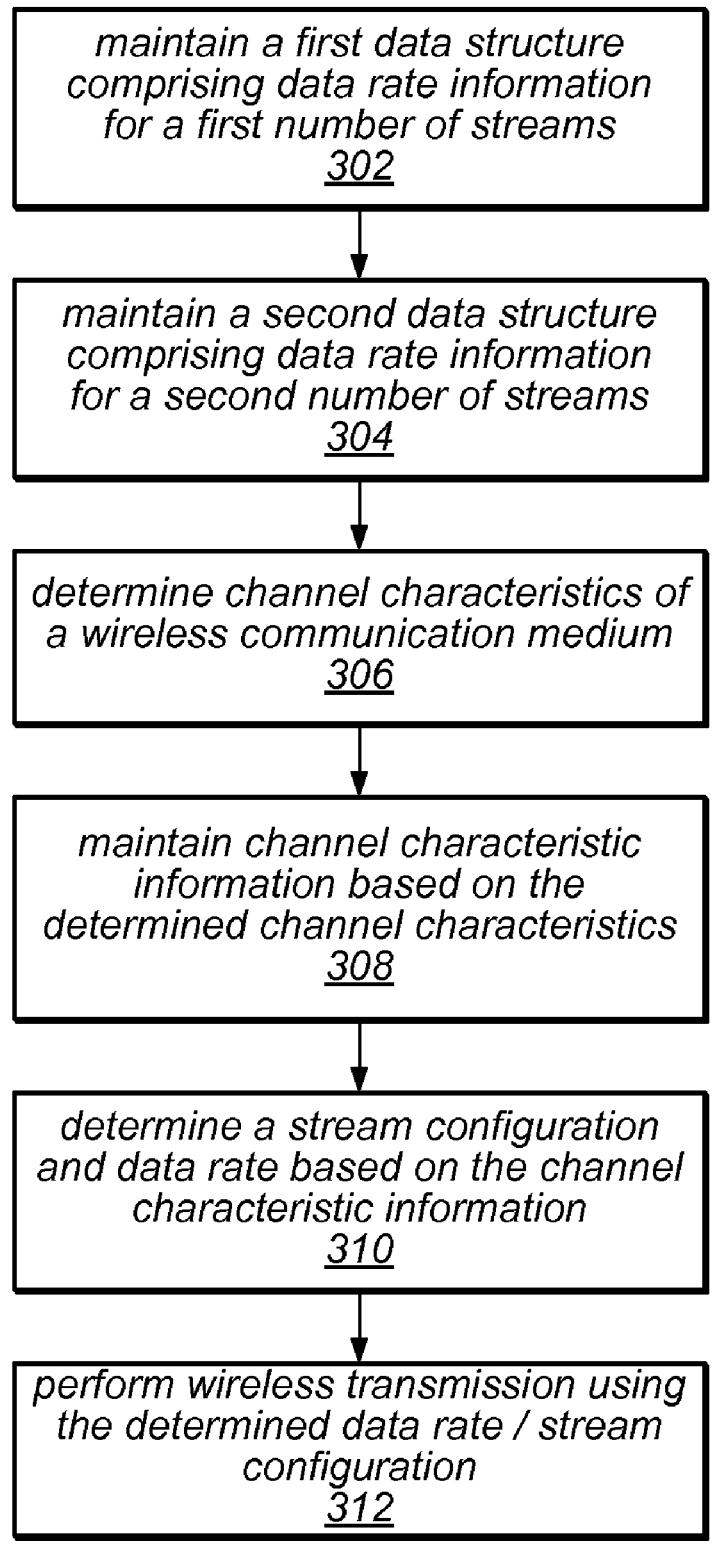
FIG. 3 is a flowchart diagram illustrating one embodiment of a method for determining a single stream or multiple stream configuration for wireless communication.

FIG. 3—Method for Determining a Configuration for Wireless Communication

FIG. 3 is a block diagram illustrating one embodiment of a method for determining stream configurations for wireless communication. As indicated above, the wireless transceiver may be included in various wireless devices, such as a wireless router. The method shown in FIG. 3 may be used in conjunction with any of the computer systems, devices, or circuits shown in the above Figures, among other devices. In various embodiments, some of the method elements shown may be performed concurrently, performed in a different order than shown, or omitted. Additional method elements may also be performed as desired. As shown, this method may operate as follows.

In 302, a first data structure may be maintained that may include data rate information for a first number of streams (e.g., for single stream transmissions). In some embodiments, the first number of streams may be partial streams, e.g., in a MIMO system. As shown in an exemplary data structure of FIG. 4, the first data structure may include PHY throughput information, data rate/stream configuration information (also sometimes referred to as modulation coding schemes MCSs), received signal strength indicator information (RSSI), and packet error rate (PER) information. The PHY throughput information may be a value, e.g., 1 Mbps, 2 Mbps, 5.5 Mbps, 11 Mbps, 13 Mbps, . . . 300 Mbps, etc. The data rate/stream configuration information may include rate information and encoding information. As shown, the data rate/stream configuration information may include 1 Mbps, CCK; 2 Mbps, CCK; 5.5 Mbps, CCK; 11 Mbps, CCK; MCS0, SS, full-GI, HT40 (e.g., for a single stream data structure); . . . ; MCS15, DS, half-GI, HT40 (e.g., for a dual stream data structure, such as the second data structure below). Note that HT40 refers to high throughput, 40 MHz; MCS0 and MCS15 refer to various known modulation coding schemes described in the 802.11n specification, and GI refers to guard interval. The data rate/stream configuration may include the particular data rate, as well as stream configuration, used to achieve a given PHY throughput.

In one embodiment, the information in the PHY throughput, Data Rate/Stream Configuration, and RSSI threshold values are static, while the PER information in the rightmost column is dynamically adjusted during operation. A single RSSI value (not shown) may also be maintained (e.g., in the first data structure or a separate data structure) and may be dynamically adjusted. Alternatively, a separate RSSI value is maintained for each PHY Throughput value. In one embodiment, separate tables are maintained for the static and dynamic values.

The RSSI information may include RSSI threshold for respective data rates/stream configurations and, similarly, the PER information (e.g., maximum PER values for a given data rate/stream configuration) may be associated with each rate. For example, as shown, for 1 Mbps, the RSSI threshold may be 4 dB and the PER cap may be 5%. Similarly, for 2 Mbps, the RSSI threshold may be 6 dB and the PER cap may be 6%; for 5.5 Mbps, the RSSI threshold may be 7 dB and the PER cap may be 10%; for 11 Mbps, the RSSI threshold may be 10 dB and the PER cap may be 20%; . . . ; and for 300 Mbps, the RSSI threshold may be 24 dB and the PER may be 55%. Thus, in one embodiment, a rate may only be used when the current RSSI is less than the threshold value and the current PER is less than the PER cap in the table. Additionally, note that the above described table is exemplary only and other table formats, information, etc. are envisioned.

In 304, a second data structure may be maintained that may include data rate information for a second number of streams (e.g., for dual stream transmissions). The second number of streams may be spatial streams, e.g., in a MIMO system. The second data structure may be similar to the first data structure described above, except related to the data rate information for the second number of streams. However, it should be noted that the first and second data structures may compose or be stored in a single data structure, or may be spread among a plurality of data streams (e.g., with static tables for each number of streams and dynamic values for each number of streams), as desired.

In 306, channel characteristics of a wireless communication medium may be determined. For example, the determined channel characteristics may include a packet error rate (PER), received signal strength indicator (RSSI), acknowledgement information, and/or other information.

In one embodiment, the channel characteristics may be determined by sending probe transmissions using various data rates and stream configurations. The probe transmissions may simply be one or more transmissions of packets, e.g., sending a plurality of packets, such as three packets at a particular data rate and stream configuration. In one embodiment, the probe transmission may be a single transmission of a jumbo packet, which may include a plurality of concatenated packets. This may be particularly useful for getting PER information for a single transmission. However, the probe transmissions may simply be normally transmitted packets, on which information is gathered. In some embodiments, every transmission may be considered a probe transmission. In other words, determining channel characteristics may be performed for every attempted transmission of packets (e.g., including those that fail). Further exemplary details regarding determining the current channel characteristics are provided below with respect to the following Figures.

In 308, current channel characteristic information may be maintained based on the determined channel characteristics of 306. In one embodiment, the current channel characteristic information may include PER information, RSSI information, acknowledgement information, and/or other information (e.g., at various data rates/stream configurations), e.g., determined in 306. Further exemplary details regarding maintaining channel characteristic information are provided below with respect to the following Figures.

In 310, a stream configuration and data rate may be determined based on the current channel characteristic information. The stream configuration and data rate may be determined using the first data structure and/or the second data structure. In other words, based on the current channel characteristic information, the method may include determining the stream configuration and data rate by comparing the current characteristic information to thresholds (e.g., the RSSI threshold in the data structures) and determining the highest data rate or data rate and stream configuration that can be used or sustained. As described below, the PER may be used to compute the throughput.

In 312, wireless transmission may be performed using the determined stream configuration. In other words, packets may be transmitted wirelessly using the determined data rate/stream configuration.

The method may include performing one or more of 302-312 (and more specifically, 306-312) a plurality of times in a dynamic fashion during wireless data transmission. In other words, the wireless device may select the appropriate data rate/stream configuration based on current channel characteristics. Thus, the wireless device may iteratively determine channel characteristics, maintain current channel characteristic information, determine a stream configuration and data rate, and perform wireless transmission a plurality of times during wireless data transmission. The wireless device may dynamically utilize different stream configurations and/or transmission rates as appropriate, dependent on current channel characteristics. Note that the method described above may be performed in a periodic fashion, e.g., based on numbers of packets sent, numbers of milliseconds, etc. In one embodiment, the stream configuration and data rate may be determined based on channel characteristics every 5-10 milliseconds.

As indicated above, the method of FIG. 3 may be performed by any of various wireless devices. In some embodiments, where two wireless devices are communicating, one of the devices may perform the method and communicate determined communication configuration (e.g., including data rate/stream configuration) to the other wireless device. However, each device may perform the method simultaneously and independently in order to determine its own maximum transmission data rate/stream configuration.

Additionally, while present embodiments are described regarding a first number of streams and a second number of streams, the method can be expanded to n number of stream configurations (e.g., between a single stream, a dual stream, or a triple stream configuration, among various possibilities of stream configurations). Thus, the method can be expanded to rate adaptation among n different stream configurations.

FIGS. 5-7B—Method for Determining a Configuration for Wireless Communication

FIGS. 5, 6A, 6B, 7A, and 7B are flowcharts of specific embodiments for determining a configuration for wireless communication. Note that these flowcharts are provided as examples only and are not intended to limit the scope of various descriptions herein (e.g., the method of FIG. 3, described above). Additionally note that data rate/stream configuration may also be referred to as "DRSC" in the following descriptions.

Figure 5:
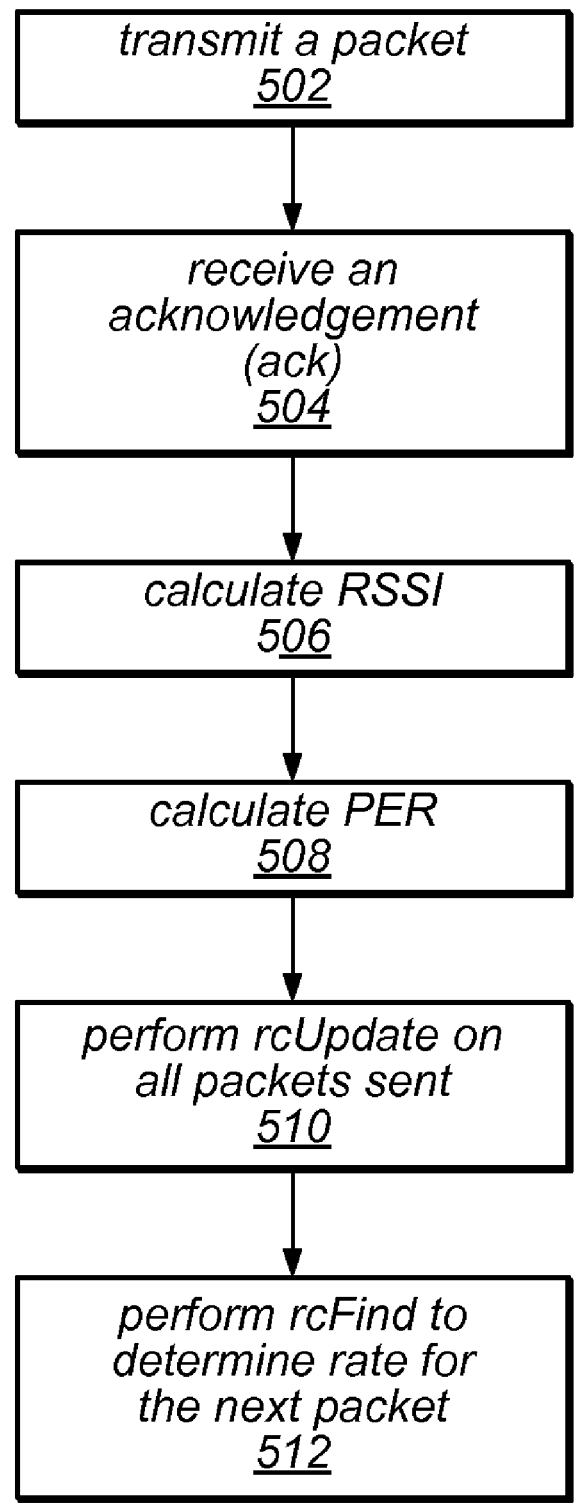
FIGS. 5-7B are flowchart diagrams illustrating various specific embodiments of a method for determining a single stream or multiple stream configuration for wireless communication.

FIG. 5 illustrates a broad method of operation for a wireless device performing wireless communication. In some embodiments, this method may be performed for every transmitted packet (e.g., successful or unsuccessful).

As shown, in 502, a packet may be transmitted. The packet may be a typical packet or a jumbo packet (e.g., including a plurality of concatenated packets). The packet may be sent at a specific data rate/stream configuration.

In 504, an acknowledgement may be received. The fact that the acknowledgement was received for the data rate/stream configuration may be recorded. When the acknowledgement is not received or the acknowledgement indicates a failed transmission, the data rate/stream configuration may not be a viable transmission configuration, but additional information (e.g., via probes) may be required to make a complete determination for the data rate/stream configuration.

In 506, an RSSI for the packet may be determined or calculated. Similarly, in 508, a PER for the packet may be determined or calculated.

In 510, rcUpdate may be performed for the transmitted packet (or all transmitted packets, e.g., since the last rcUpdate). It should be noted that rcUpdate may be performed periodically (e.g., based on time, number of transmitted packets, number of attempted transmissions, etc.) or for each transmitted or attempted packet. Specific embodiments of rcUpdate are described below regarding FIGS. 7A and 7B.

In 512, rcFind may be performed to determine a data rate/stream configuration for the next packet. Specific embodiments of rcFind are described below regarding FIGS. 6A and 6B.

Figure 6A:
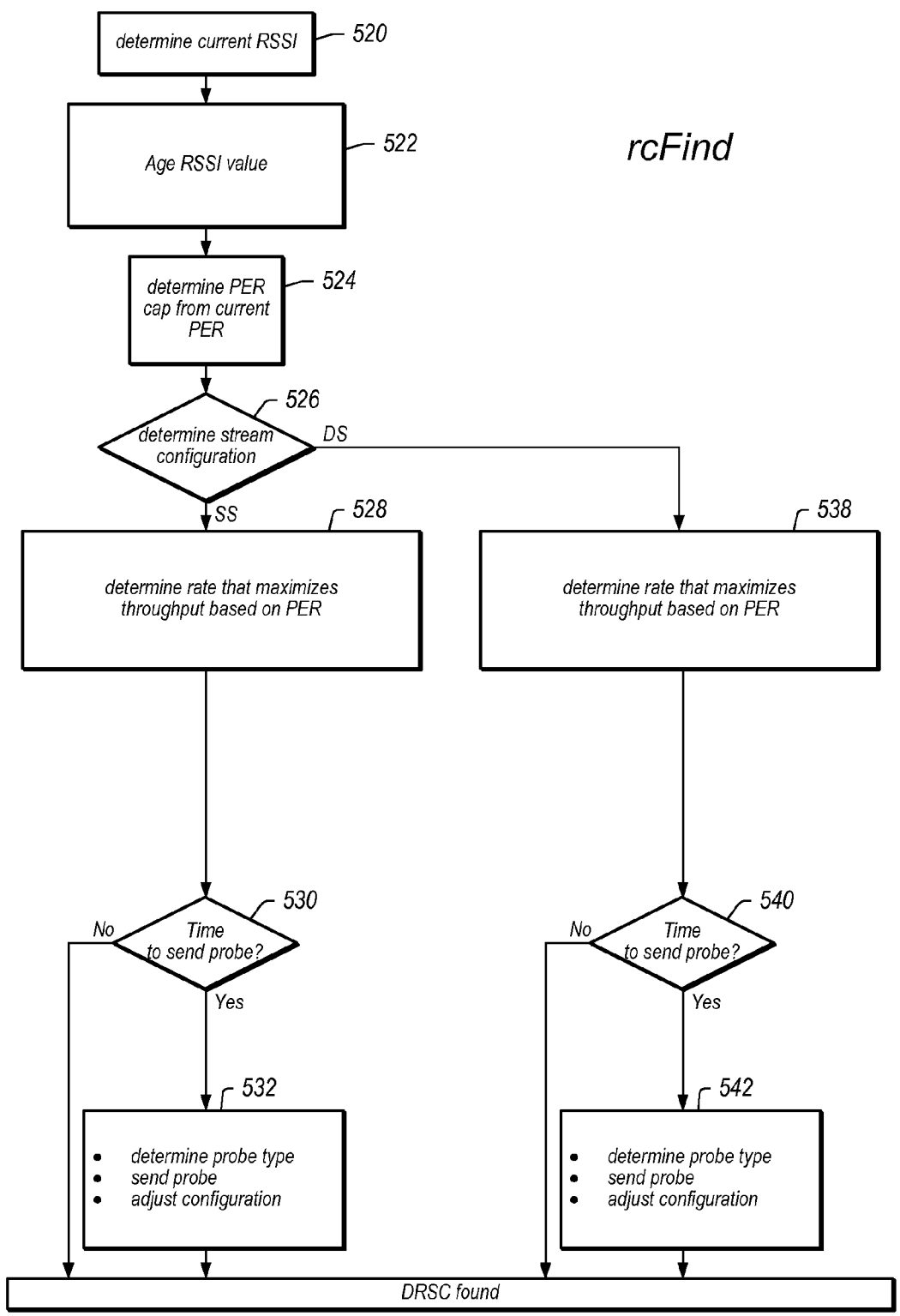
Figure 6B:
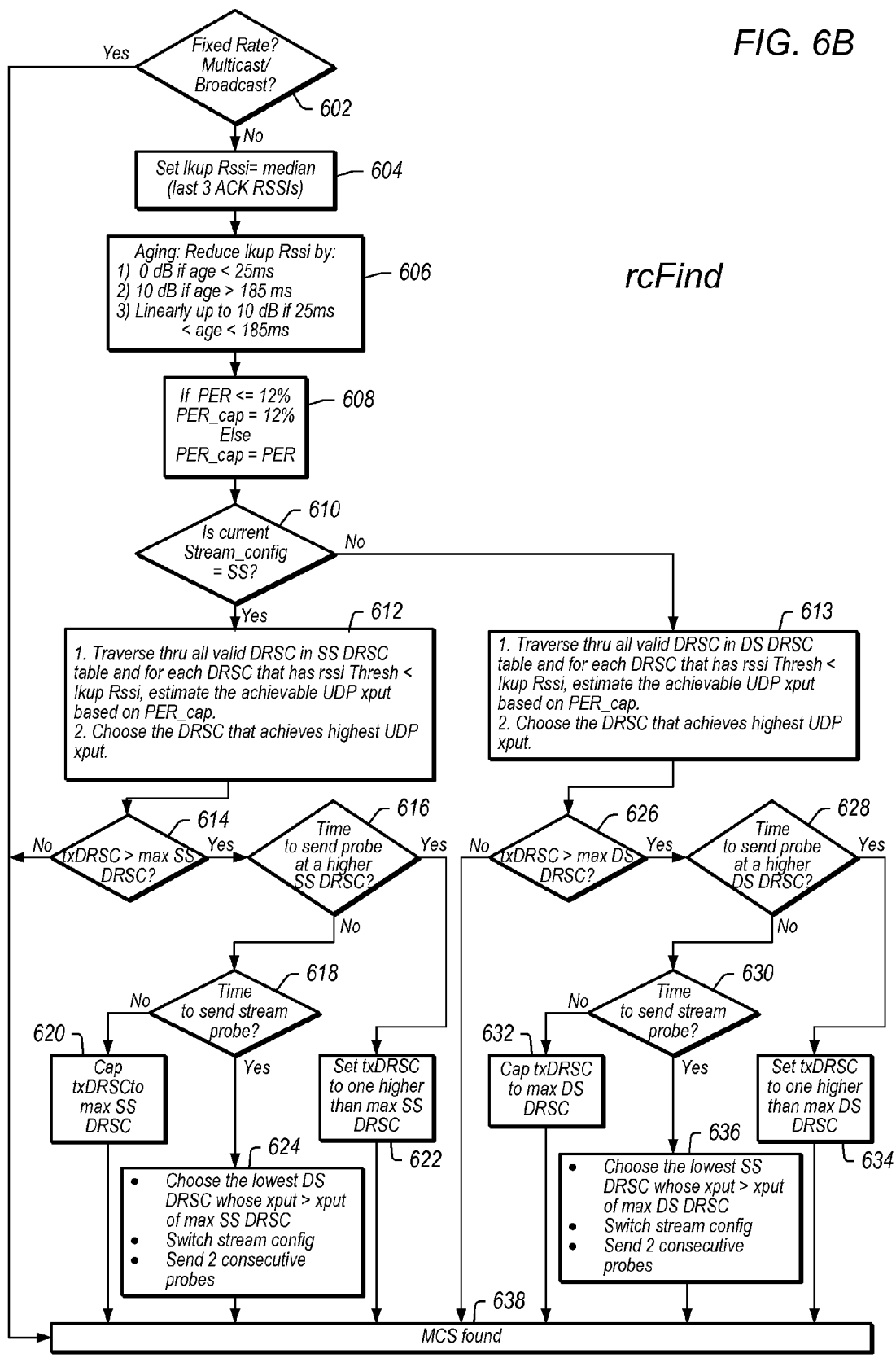

FIGS. 6A and 6B

Figure 7A:
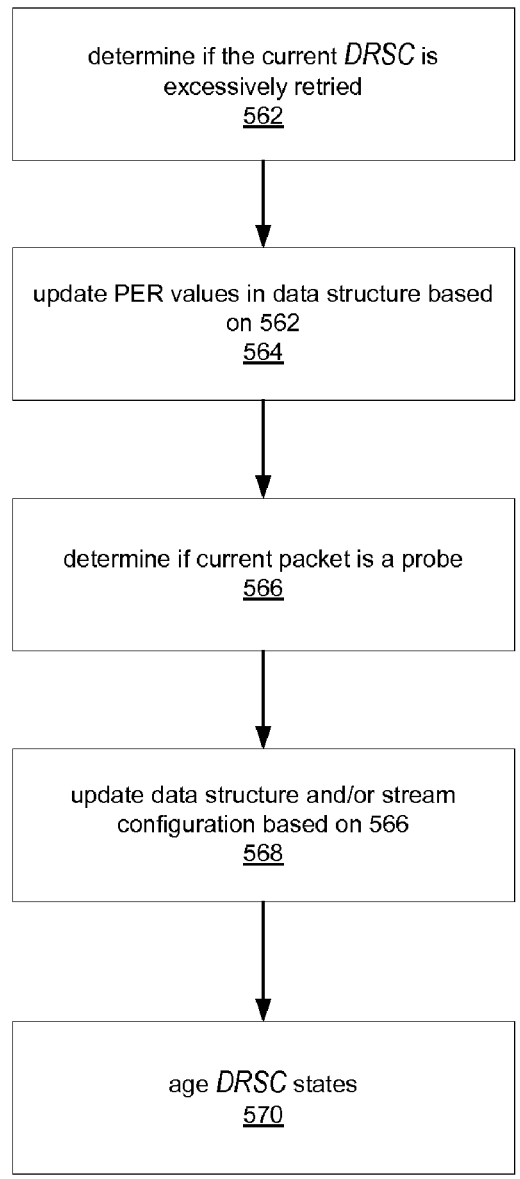
Figure 7B:
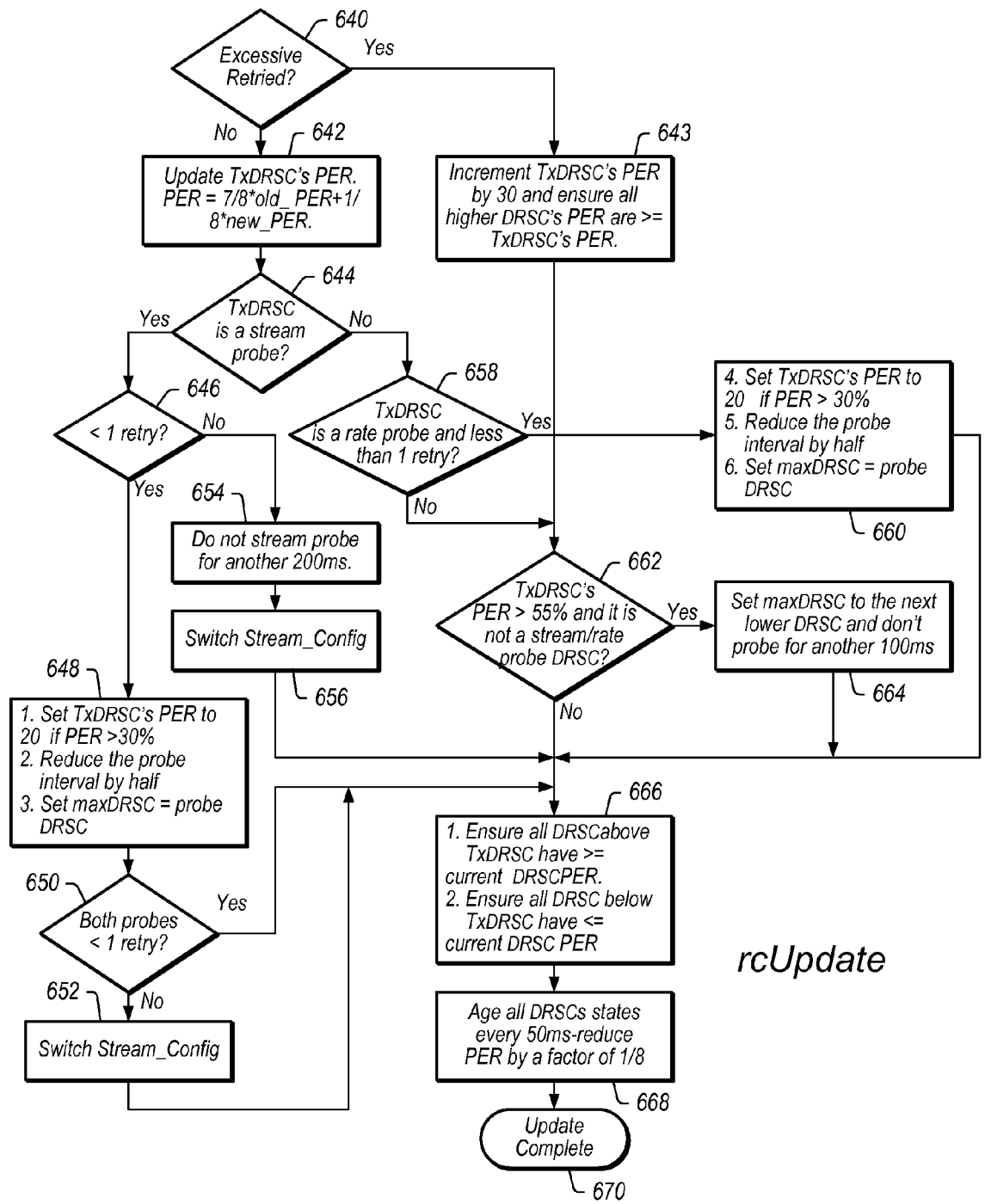

FIGS. 6A and 6B provides a method for determining the rate for the next transmission (rcFind) and FIGS. 7A and 7B provides a method for updating PER statistics and probe intervals (rcUpdate). More specifically FIGS. 6A and 7A each provide simple flow charts for rcFind and rcUpdate, respectively, and FIGS. 6B and 7B provide more explicit flow charts for rcFind and rcUpdate respectively. As indicated above, these flowcharts and descriptions are exemplary only and modifications and variations are envisioned.

In 520 (of FIG. 6A), a lookup (lkup) or current RSSI is determined (e.g., of a transmitted packet, as in 506 above). In some embodiments, the lkup RSSI may be determined as the median RSSI of the last three acknowledged transmitted packets. In 522, the RSSI value may be aged. The RSSI value may be aged according to the following formula (although others are envisioned): do not reduce dB of RSSI value if the RSSI is less than 25 ms old, reduce by 10 dB if age is greater than 185 ms, and reduce linearly between 25 ms and 185 ms old.

In 524, a PER cap may be determined from the current PER value. In one embodiment, if the current PER is less than or equal to 12%, the PER cap may be assigned to 12%, otherwise the PER cap may be assigned to the current PER value.

In 526, the current stream configuration may be determined (e.g., whether the current stream configuration is single stream (SS) or dual stream (DS)).

For SS, in 528, a rate may be determined that maximizes throughput based on the current PER, e.g., using a single stream data structure.

In 530, it is determine whether a stream probe or rate probe should be sent. If it is time, in 532, a probe type is determined, a probe is sent, and the configuration may be adjusted (e.g., switching streams or configurations) to determine an data rate/stream configuration to use. However, if it is not time to send a probe, the determined data rate/stream configuration of 528 is used. The same procedure may be performed for DS, except using a dual stream data structure for 538. Similarly, it may be determined in 540 whether it is time to send a probe, and if so, appropriate measures may be taken in 542 (as in 532 above).

Turning now to FIG. 6B, which provides more exemplary detail on the rcFind procedure, in 602, it is determined whether a fixed rate, multicast, or broadcast is to be performed. If so, the data rate/stream configuration is correspondingly found in 638 (since rate adaptation may not be necessary). If not, the method continues to 604.

In 604, the lookup (lkup) RSSI is assigned to the median RSSI of the last n acknowledged packets, e.g., the last 3 acknowledged packets.

In 606, the lkup information is aged according to an aging procedure. In this case, the lkup information is not aged if it is less than 25 ms old, is aged by 10 dB if the age is greater than 185 ms, and is aged accordingly to a linear scale from 0 to 10 dB between 25 ms and 185 ms (although other scales are envisioned).

In 608, the PER cap is determined. More specifically, if the current PER is less than or equal to 12% (other values are envisioned), the PER cap is set to 12% whereas it is set to the current PER if the PER is greater than 12%.

In 610, it is determined if the current stream configuration is equal to SS (single stream). In some embodiments, a variable "Stream_config" may be used which can take either of two values, single stream and dual stream (although more than two types of streams are envisioned, as indicated above). For example, in one embodiment, the variable "Stream_config" can take three or more values, such as single stream, dual stream, three streams, etc.

If it is, in 612 all valid DRSC values in the SS stream DRSC table are traversed. For each DRSC that has an RSSI threshold less than the Lkup RSSI, the achievable UDP (user datagram protocol) throughput is estimated based on the PER cap determined in 608. Accordingly, the highest UDP throughput is chosen from the available DRSC values. For example, if the lkup RSSI is 20 dB, but the DRSC is 25 dB, then another DRSC may need to be chosen (since the 20 dB is less than the threshold RSSI of 25 dB). Thus, the highest UDP DRSC of the table may be determined by traversing through all the available rates and comparing the lkup RSSI to the RSSI threshold using the current PER. Note that the PER cap may be different for different rates; accordingly, the DRSC with the highest throughput (based on the PER) should be chosen. Throughput may be calculated according to the following formula:

$$\text{throughput} = (1 - \text{PER\_cap}) * \text{the maximum throughput of the corresponding rate}$$

In 614, if the determined DRSC (txDRSC) (from 612) is not greater than the current maximum SS DRSC, then the txDRSC is selected in 638. However, if it is, it is determined in 616 whether a probe for a higher SS DRSC (a rate probe) should be sent (e.g., based on a periodic schedule of probing, e.g., 100 ms, among other possibilities). If so, in 622, the txDRSC is set to a value higher than the max SS DRSC (e.g., the next highest value). At this point the DRSC is chosen in 638.

However, if a rate probe should not be sent, it is determined in 618 whether it is time to send a stream probe. Note that a stream probe is a probe used to test a stream configuration and a rate probe is used to test a particular rate within a stream configuration. If so, in 624, the lowest DS (dual stream) DRSC whose throughput is greater than the throughput of the max SSCS is selected, the stream configuration is switched, and probes may be sent (e.g., two consecutive successful probes, to ensure that the stream configuration should change). It should be noted that stream configuration changes may be treated more conservatively than rate changes within a stream since changes within a stream configuration typically have a high reliability fall back position (e.g., the last properly used DRSC value) whereas a stream configuration change does not have such a fall back within that stream configuration. Thus, more than one probe may be required when switching stream configurations to ensure that the alternate stream configuration and DRSC is valid and sustainable.

Additionally, for similar reasons, stream configurations may only be switched when there is a large (in comparison to rate changes within the stream configuration) potential throughput differential between the current DRSC throughput and the potential alternate stream configuration DRSC throughput.

Accordingly, the DRSC is found in 638. However, if it is not time to send the probe, in 620, the txDRSC is set equal to the max SS DRSC, and the DRSC is found in 638.

Turning back to the decision in 610, if the current stream configuration does not equal SS, all valid DRSC in the DS (dual stream) DRSC table are traversed. For each DRSC in the DS data structure that has RSSI threshold <Lkup RSSI, an achievable UDP throughput is estimated based on the PER cap (see throughput formula above). Accordingly, the DRSC that achieves the highest UDP throughput is selected.

In 626, it is determined if the currently selected DRSC (txDRSC) is greater than the max DS DRSC. If it is not, the DRSC is found in 638 (as txDRSC). However, if it is, in 628, it is determined whether it is time to send a probe at a higher DS DRSC (a DS rate probe).

If it is time to send a rate probe, one or more probes are sent at an DRSC one level higher (according to the DS data structure) than the max DS DRSC in 634, and the DRSC is found in 638. However, if it is not time to send a rate probe, it is determined in 630 if it is time to send a stream probe. If not, in 632, the txDRSC is set equal to the max DS DRSC, and the DRSC is found in 638. If it is, in 636, the lowest SS DRSC whose throughput is greater than the throughput of max DS DRSC is selected, the stream configuration is switched, and probes may be sent for the new configuration (e.g., two consecutive probes). Accordingly, in 638, the DRSC is found.

Note that the maximum DRSC for dual stream and single stream may be maintained separately. Additionally, as indicated above, PER caps and RSSI values may be maintained per DRSC per stream configuration. In other words, PER caps and RSSI values may be different for every entry in both single stream and multiple stream data structures.

FIGS. 7A and 7B

As indicated above FIGS. 7A and 7B provide simple and more detailed exemplary flowcharts of the rcUpdate procedure referenced in 510 of FIG. 5. As noted above, these are exemplary only and modifications and alternate methods are envisioned.

In 562 (of FIG. 7A), it is determined if excessive retries on the current DRSC and possibly lower DRSC have occurred. More specifically, it is determined if transmissions of the current DRSC have failed excessively (e.g., on an order of magnitude of 3, 5, 10, 20 failed packet transmissions).

Accordingly, in 564, PER values of the current DRSC may be updated in various data structures (e.g., the SS data structure or the DS data structure) based on the determination of 562.

Where excessive retries have not occurred, in 566, it may be determined if the current packets or DRSC value is part of a probe transmission (e.g., stream or rate probe).

In 568, data structures and/or the stream configuration may be updated based on 566 and/or the results of the probe. For example, if the DRSC value is part of a stream probe, and it was successful, the stream configuration may be changed to the probed DRSC. If not, the stream configuration may remain unchanged. Similarly, a successful rate probe may increase the rate in the current stream configuration to a higher value for increased throughput. Where the current DRSC value/packets are not probes (rate or stream), then maintenance of the data structures may be performed, as described in more detail below.

Finally, in 570, DRSC states or values in the SS and/or DS data structures may be aged.

Turning now to FIG. 7B, which provides more exemplary detail on the rcUpdate procedure, in 640, it is determined if excessive retries have occurred with the current DRSC value, as described in 562 above.

In 642 if there are not excessive retries of the current DRSC, the TxDRSC PER is updated (e.g., in the current stream configuration's data structure) according to the formula (PER=⅞*old_PER+⅛*new_PER) in 642. Thus, the current DRSC PER value may be updated with a bias for the old PER values.

In 644, it is determined if TxDRSC is a stream probe. If it is, in 646, it is determined whether there is less than one retry (i.e., if the stream probe is successful). If not, the stream is not probed for another 200 ms (in 654) and the stream configuration is switched in 656. Note that switching the stream configuration actually results in the stream configuration remaining the same since the previous transmission. This is due to the fact that when a stream probe is sent (e.g., from rcFind, described above) the stream configuration is switched from a current stream configuration to an alternate stream configuration, and if the stream probe is unsuccessful (as determined in 646->656), the stream configuration is switched back to the current stream configuration (rather than the alternate stream configuration which just failed).

Flow continues to 666, described in more detail below. If the TxDRSC has less than one retry (from 646), in 648, the TxDRSC PER is set to a value, e.g., 20, if the PER is greater than a threshold, e.g., 30%, the probe interval is reduced by half, and the maxDRSC is set to the probe DRSC. Thus, since the first probe was successful, the data structure of the selected stream configuration is updated and the maxDRSC value for the selected stream configuration is also updated. An additional probe is correspondingly sent out at faster rate.

Accordingly, in 650, it is determined if both probes have a less than one retry (i.e., both successful); if they do, flow continues to 666, described below. However, if they do not, the stream configuration is switched back to the previous stream configuration (as described above) in 652 and flow continues to 666.

Turning back to the determination that TxDRSC was not a stream probe (in 644), if TxDRSC is a rate probe and less than one retry (in 658), in 660, the TxDRSC PER is set to a value, e.g., 20, if PER is greater than a threshold, e.g., 30%, the probe interval is reduced by half, and the maxDRSC probe is set to the probe DRSC. Thus, the rate is updated upon a successful rate probe. Flow continues to 666.

Turning back to the determination of excessive retries in 640, if it has occurred, then in 643 the TxDRSC PER is incremented by 30 and it is ensured that all higher DRSC PER's (in the corresponding data structure) are greater or equal to the TxDRSC PER. Thus, the current PER (which was excessively failed) is penalized, and all higher data rates are correspondingly penalized since higher rates cannot (or typically do not) have better transmission success than those below. Flow continues to 662 joined by the pathway where the TxDRSC is not a rate probe with less than one retry (i.e., the rate probe failed).

In 662, it is determined if the TxDRSC PER is greater than 55% and is not a stream or rate probe DRSC. If not, flow continues to 666; if so, in 664, the maxDRSC is set to the next lower DRSC and a probe is not sent for another 100 ms. Thus, in this case, the maxDRSC is penalized due to the high PER (greater than 55%). Flow from 664 also continues to 666.

In 666, maintenance on the data structure corresponding to the stream configuration of the current DRSC is performed.

More specifically, for consistency, it is ensured that all DRSC above TxDRSC have a PER value greater than or equal to the current DRSC PER. It is also ensured that all DRSC below TxDRSC have a PER value less than or equal to the current DRSC PER.

In 668, all DRSC states are aged every 50 ms (the PER is reduced by a factor of ⅛). Aging the DRSC states (e.g., the PER values) may encourage the wireless device to keep attempting higher transmission rates over time (since reducing the PER values by a factor of ⅛ makes those transmission configurations more "attractive"). This may ensure that the highest achievable DRSC is used during wireless transmission.

In 670, the update is completed.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for performing wireless transmission of data over a wireless communication medium, the method comprising:
    maintaining a first data structure comprising data rate information for transmission using a first number of streams;
    maintaining a second data structure comprising data rate information for transmission using a second number of streams;
    determining channel characteristics of the wireless communication medium;
    maintaining channel characteristic information based on the determined channel characteristics of the wireless communication medium
    determining a stream configuration and data rate based on the channel characteristic information, wherein said determining the stream configuration comprises selecting either the first number of streams or the second number of streams;
    performing wireless transmission using the determined stream configuration and data rate;
    wherein said determining channel characteristics, maintaining channel characteristic information, determining a stream configuration and data rate, and performing wireless transmission are dynamically performed a plurality of times during wireless data transmission.

2. The method of claim 1, wherein the first number of streams is 1.

3. The method of claim 2, wherein the second number of streams is 2.

4. The method of claim 1,
    wherein the channel characteristic information comprises a packet error rate.

5. The method of claim 1, wherein said determining channel characteristics of the wireless communication medium comprises sending one or more probe transmissions.

6. The method of claim 1, wherein the first data structure and the second data structure comprise first and second tables respectively, wherein each table comprises received signal strength indicators (RSSIs) and data modulation information.

7. The method of claim 1, wherein said determining channel characteristics of the wireless communication medium comprises:
    transmitting one or more packets; and
    storing information regarding the one or more packets, wherein the information comprises acknowledgement information, received signal strength indicator (RSSI) information, and/or packet error rate (PER) information.

8. The method of claim 1, wherein said determining channel characteristics is performed for every attempted transmission of packets.

9. A non-transitory computer accessible memory medium storing program instructions for performing wireless transmission of data over a wireless communication medium, wherein the program instructions are executable to:
    maintain a first data structure comprising data rate information for single stream transmission;
    maintain a second data structure comprising data rate information for multiple stream transmission;
    determine channel characteristics of the wireless communication medium;
    maintain channel characteristic information based on the determined channel characteristics of the wireless communication medium
    determine a stream configuration and data rate based on the channel characteristic information, wherein said determining the stream configuration comprises selecting either single stream or multiple stream transmission;
    perform wireless transmission using the determined stream configuration and data rate;
    wherein said determining channel characteristics, maintaining channel characteristic information, determining a stream configuration and data rate, and performing wireless transmission are dynamically performed a plurality of times during wireless data transmission.

10. The non-transitory memory medium of claim 9, wherein the channel characteristic information comprises a packet error rate.

11. The non-transitory memory medium of claim 9, wherein said determining channel characteristics of the wireless communication medium comprises sending one or more probe transmissions.

12. The non-transitory memory medium of claim 9, wherein the first data structure and the second data structure comprise first and second tables respectively, wherein each table comprises received signal strength indicators (RSSIs) and data modulation information.

13. The non-transitory memory medium of claim 9, wherein said determining channel characteristics of the wireless communication medium comprises:
    storing information regarding one or more transmitted packets, wherein the information comprises acknowledgement information, received signal strength indicator (RSSI) information, and/or packet error rate (PER) information.

14. The non-transitory memory medium of claim 9, wherein said determining channel characteristics is performed for every attempted transmission of packets.

15. A wireless device, comprising:
    a transceiver;
    a processor coupled to the transceiver; and
    a memory medium coupled to the processor, wherein the memory medium stores:
        a first data structure comprising data rate information for transmission using a first number of streams; and
        a second data structure comprising data rate information for transmission using a second number of streams;
    wherein the memory medium also stores program instructions for performing wireless transmission of data over a wireless communication medium, wherein the program instructions are executable by the processor to:
        determine channel characteristics of the wireless communication medium using the transceiver;

maintain channel characteristic information based on the determined channel characteristics of the wireless communication medium; and determine a stream configuration and data rate based on the channel characteristic information, wherein said determining the stream configuration comprises selecting either the first number of streams or the second number of streams;

wherein the transceiver is configurable to perform wireless transmission using the determined stream configuration and data rate;

wherein said determining channel characteristics, maintaining channel characteristic information, determining a stream configuration and data rate, and performing wireless transmission are dynamically performed a plurality of times during wireless data transmission.

16. The wireless device of claim 15, wherein the first number of streams is 1.

17. The wireless device of claim 15, wherein the second number of streams is 2.

18. The wireless device of claim 15, wherein the channel characteristic information comprises a packet error rate.

19. The wireless device of claim 15, wherein said determining channel characteristics of the wireless communication medium comprises sending one or more probe transmissions.

20. The wireless device of claim 15, wherein the first data structure and the second data structure comprise first and second tables respectively, wherein each table comprises received signal strength indicators (RSSIs) and data modulation information.

21. The wireless device of claim 15, wherein said determining channel characteristics of the wireless communication medium comprises:

storing information regarding one or more transmitted packets, wherein the information comprises acknowledgement information, received signal strength indicator (RSSI) information, and/or packet error rate (PER) information.

22. The wireless device of claim 15, wherein said determining channel characteristics is performed for every attempted transmission of packets.

* * * * *